United States Patent [19]

Russell et al.

[11] Patent Number: 5,170,031

[45] Date of Patent: Dec. 8, 1992

[54] JOINING METHOD

[75] Inventors: Derek J. Russell; Christopher J. Dawes, both of Cambridge, Great Britain

[73] Assignee: The Welding Institute, Cambridge, England

[21] Appl. No.: 784,437

[22] PCT Filed: May 3, 1990

[86] PCT No.: PCT/GB90/00683
§ 371 Date: Nov. 4, 1991
§ 102(e) Date: Nov. 4, 1991

[87] PCT Pub. No.: WO90/13391
PCT Pub. Date: Nov. 15, 1990

[30] Foreign Application Priority Data

May 5, 1989 [GB] United Kingdom ............... 8910302

[51] Int. Cl.$^5$ ............................................ B23K 26/00
[52] U.S. Cl. ............................ 219/121.64; 219/121.78
[58] Field of Search ...................... 219/121.13, 121.14, 219/121.63, 121.64, 121.63, 121.76, 121.78

[56] References Cited

U.S. PATENT DOCUMENTS

| 4,185,185 | 1/1980 | Adlam | 219/121.84 |
| 4,187,408 | 2/1980 | Heile | 219/121.64 |
| 4,471,204 | 9/1984 | Takafuji et al. | 219/121.84 |
| 4,560,855 | 12/1985 | Takafuji et al. | 219/121.64 |
| 4,649,254 | 3/1987 | Bedell et al. | 219/121.64 |
| 4,912,297 | 3/1990 | Beyer et al. | 219/121.63 |

FOREIGN PATENT DOCUMENTS 2328543 10/1976 France .
WO88/08353 11/1988 PCT Int'l Appl. .
90/00683 8/1990 PCT Int'l Appl. .

Primary Examiner—C. L. Albritton
Attorney, Agent, or Firm—Martin M. Novack

[57] ABSTRACT

A method of joining a covering layer (9) onto a substrate (10) comprises placing part of the covering layer (9) on the substrate (10) with the remaining part of the covering layer spaced from the substrate so as to expose a region of contact (5) between the covering layer and substrate. A focussed power beam such as a laser or electron beam impinges on the contact region (5) so as to bond or fuse the substrate (10) and covering layer (9) together. The spaced part of the covering layer (9) is then moved towards the substrate (10) so as to change the position of the contact region (5) and the focussed power beam is caused to impinge on the new contact region. These steps are repeated until the covering layer is bonded or fused to the substrate.

13 Claims, 7 Drawing Sheets

JOINING METHOD

The invention relates to a method of bonding a covering layer onto a substrate For example, the invention is particularly applicable to cladding a substrate with a different material or compound.

Cladding by arc welding by various processes such as manual metal arc, submerged arc, flux cored wire, is well-known, as are techniques using controlled or inert atmospheres such as TIG and MIG welding. In general, in all arc welding there is a significant melting of the base material or substrate and typically some 30% of the base material is mixed with the deposited material. This dilution of the cladding changes its chemical composition and may lead to deleterious properties in terms of strength, corrosion or wear resistance and so forth. It is common practice in such arc welding to deposit the cladding in a series of layers, each of which picks up some material from the prior layer. Thus, where the pick-up is of the order of 30%, then in a multilayer deposit the third pass may only contain some 3% of the original substrate. Other techniques for achieving low dilution include adding a filler wire, which may be preheated, by a process such as TIG or plasma arc welding operated to result in a relatively low penetration of the substrate. Other variants on these techniques are aimed at obtaining minimal penetration of the substrate with a relatively thick deposit to reduce the overall dilution to, say, 3% in one operation.

Other cladding methods avoid fusion of the substrate, such as brazing or diffusion bonding a clad layer to a substrate, or friction surfacing where the consumable electrode is deposited as a plasticised layer on the substrate. These various techniques are not necessarily applicable to all sizes of component from small components clad with thin layers to very large components of surface dimension more than 1 m square. Among the difficulties experienced are obtaining a sufficiently even deposit or even adhesion to the substrate, or with large components providing the total power input required for heating and cladding in a single operation.

In accordance with the present invention, a method of joining a covering layer to a substrate comprises placing part of the covering layer on the substrate with the remaining part of the covering layer spaced from the substrate so as to expose a region of contact between the covering layer and substrate; causing a focussed power beam to impinge on the contact region so as to bond or fuse the substrate and covering layer together; and thereafter a) moving the spaced part of the covering layer towards the substrate so as to change the position of the contact region;

b) causing the focussed power beam to impinge on the new contact region so as to cause bonding or fusion; and, c) repeating steps a) and b) until the covering layer is bonded or fused to the substrate and is characterised in that the beam is traversed along the contact region in step (b); and in that step (a) is carried out in a non-continuous stepwise manner.

A new approach is proposed in which a focussed power beam is directed at a closing gap arranged between the covering or cladding layer and the substrate, such that the respective surfaces are heated to effect a bond or fusion weld which is progressively propagated in a direction substantially normal to the axis defined by the closing gap along the surface to be covered or clad. The invention enables a covering layer to be bonded or fused to the substrate with substantially no dilution or contamination of the covering layer by the substrate material at the outer or exposed surface of the covering layer.

Examples of suitable power beams include laser beams and electron beams.

Preferably, the focussed beam produces a softened or melted zone which has a relatively high depth/width ratio, for example in excess of 5/1 in the direction of the beam axis compared with normal to the substrate surface. Thus, the width is the degree of melting sideways with respect to the beam (which is normally slightly larger than the beam dimension at focus). In these cases the width of the softened or fused zone produced by the focussed beam is small compared with that obtained in arc welding (where typically the depth/width ratio is less than 1) particularly where the total melted width (cladding and substrate) is less than the thickness of the clad layer, for example less than half this thickness.

Normally the beam impinges on both the substrate and cladding as it is difficult to avoid striking both at the position of the contacting interface. However, the beam could be biased to impinge more on one than the other, although in general it would not be sufficient to impinge on only one of the contacting materials.

In fusion welding with these techniques of high depth/width ratio an appreciable amount of both clad and substrate materials is melted, but the mixed zone does not extend to the surface of the clad material remote from the substrate. There is advantage in reducing the width dimension of the melted zone or its position so that less than half of the thickness of the clad material is mixed or alloyed with the substrate. This leaves a substantial amount of the cladding unchanged, being neither diluted by nor contaminated with the substrate.

For relatively small substrates that is of limited dimension in the transverse direction the focussed beam can be caused to sweep or oscillate slowly to produce an extended heating or fusion zone between the mating cladding and substrate along the full dimension of the substrate or cladding in the same plane as the oscillation. Thus, the full width of the substrate being clad is progressively heated and/or melted so that the cladding is joined to the substrate in a zone defined by the extent of the oscillation with the depth of penetration being determined by the focussed beam. Alternatively, and particularly for larger substrates, the focussed beam is made to traverse the full width of the substrate being clad. This either entails moving the source of the focussed beam relative to the substrate so that its whole width is scanned or, as in the case of laser beams, the unfocussed or substantially collimated beam may be deflected appropriately by mirrors before being brought to a focus in the interface region of the mating surfaces.

Typically, the power beam will be swept along the complete interface region. However, the substrate and cladding could be moved instead or as well relative to the beam.

In both these cases the work (substrate and covering layer) is progressively indexed or moved substantially in the direction of the focussed beam such that a subsequent sweep of the focussed beam heats a new region progressively along the work in a direction perpendicular to the transverse width of the substrate noted above.

The materials concerned will usually include metals and their alloys, but with laser beam heating can also include non-metals such as plastics, particularly thermoplastics, including thermoplastic composites.

Some examples of methods of cladding a substrate will now be described with reference to the accompanying drawings, in which:

FIGS. 4a and 4b illustrate successive stages in the cladding of a cylinder; while

Figure 1:
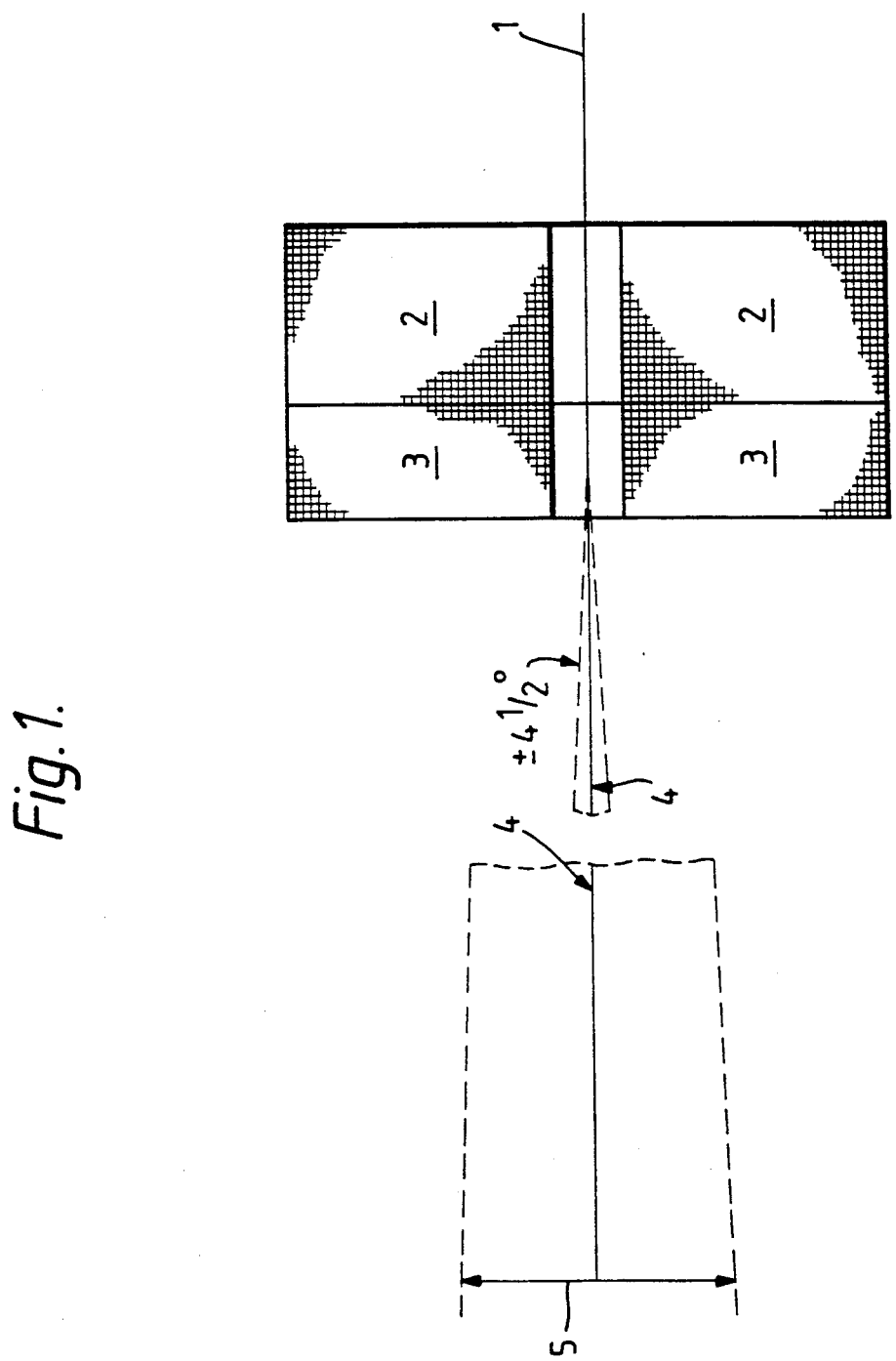
FIG. 1 is a schematic view of electron beam focussing and deflecting apparatus.

FIG. 1 illustrates schematically an electron beam 1 generated from a source (not shown) which after passing through the centre of a hollow anode (not shown) is focussed by a focussing lens 2 and then fed between conventional deflection coils 3 which cause the focussed beam 4 to deflect along the interface 5 between a cladding and substrate (not shown). At the same time as scanning along the interface 5, the beam is caused to oscillate about the beam axis so that the beam moves in a sinusoidal or sawtooth manner in the scanning direction. Following a full scan along the transverse length dimension of the interface 5, the cladding is moved towards the substrate so as to advance the interface in the direction of the beam axis.

For example, with an electron beam system providing a finely focussed beam at an operating working distance of 500 mm from the deflecting coils, as illustrated in FIG. 1, a deflection of about ±4½° gives a scan of about ±40 mm. At a beam power of 5 kW resulting in a penetration in excess of 5 mm with a sawtooth sweep rate of around 2000 mm per minute forward and rapid return, the transverse weld could be advanced some 4 mm between each sweep, giving an average forward progression of some 100 mm per minute as a maximum. Preferably in between the main sweeps, the beam current is reduced to a low value, and/or the beam parked in a zone adjacent but separate from the work, until the incremental forward movement of the work is complete, before commencing the next pass. Theoretically, the point of focus at 500 mm radius would change some 1.6 mm for the ±40 mm sweep. This, however, is not significant as the penetration obtained by the electron beam is determined by the position of the mating surfaces rather than by the theoretical point of focus. In any case the effective depth of field would be of the order of ±10 mm at that radius within which welding behaviour is substantially identical.

Figure 2:
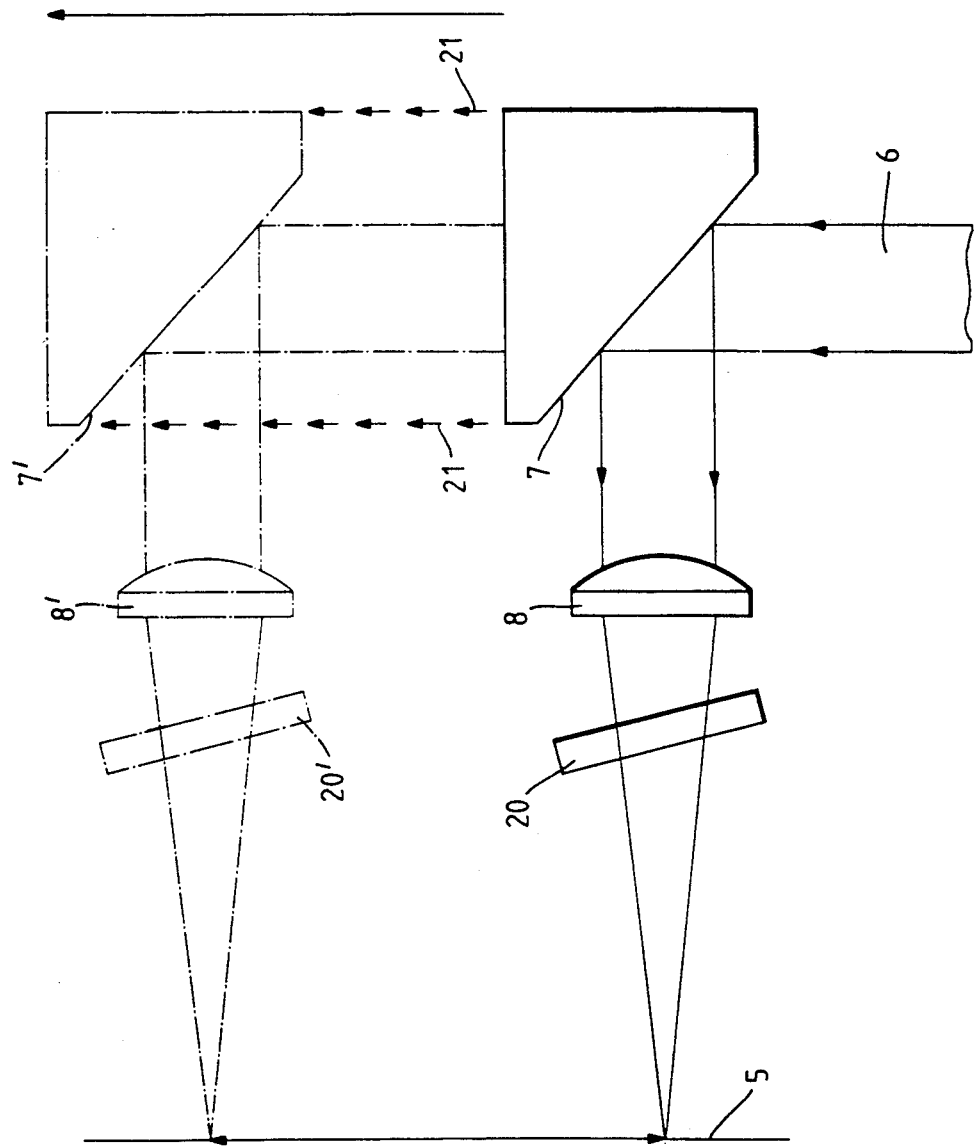
FIG. 2 is a schematic drawing of a laser beam focussing and deflecting system.

FIG. 2 illustrates a laser beam based system in which a collimated laser beam 6 generated from a source (not shown) impinges upon a 90° mirror 7 where it is reflected onto a focussing lens 8 which focusses the beam onto the interface 5. The focussed beam is caused to traverse along the length of the interface 5 by traversing the mirror 7 and lens 8 as shown by arrows 21 in FIG. 2 to positions 7', 8'. For example, this traverse of the optics can cause the point of impingement of the laser beam on the interface to traverse through a length of 100 mm in the direction of the original collimated beam.

In the case of a focussed laser beam, the operating focal length is typically of the order of 100-400 mm and for this a translation of the focussing system is preferable to an angular sweep. Typically, the focussed spot will be about 250 mm from the focussing lens 8. In principle, the transverse positioning of the laser beam can be extended over considerable distances up to, say, 20 m. For greater distances, and to ensure good quality of the beam at focus, the workpiece can be moved laterally with respect to the laser beam head. The beam itself can be oscillated about its axis by means of a rotating halide block 20 between the work and the lens 8. Typically, the block is some 6 mm thick and angled at some 12° to 18° to the optical axis and rotated at speeds in excess of 500 rpm such as about 3000 rpm to produce beam oscillation about the axis at about 50 Hz. The block 20 will traverse with the mirror 7 and lens 8 to a position 20'.

Figure 3A:
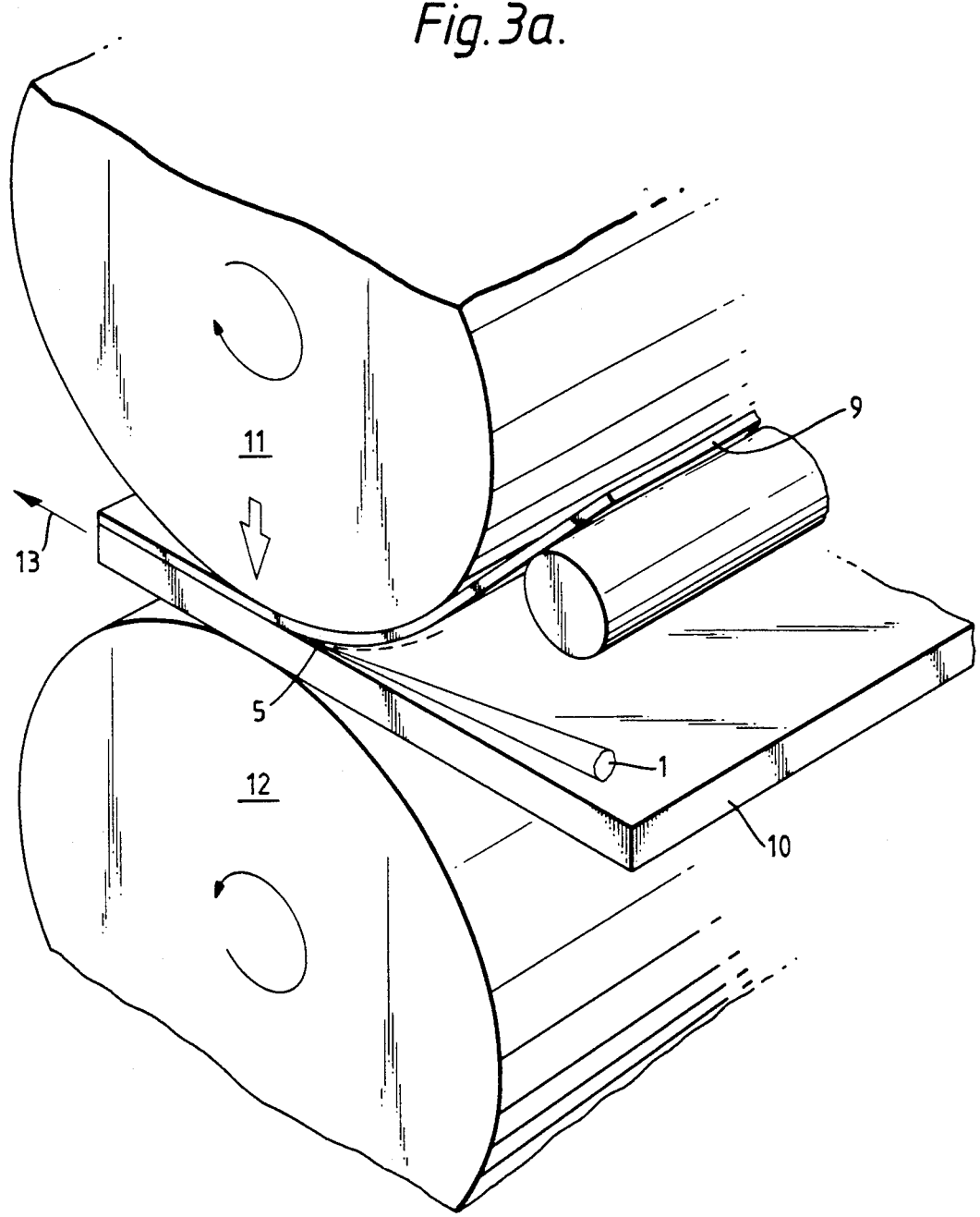
FIG. 3a illustrates the cladding of a planar substrate.

FIG. 3a illustrates the way in which an interface region is produced when bonding a cladding 9 to a base metal substrate 10. The cladding 9 and base metal substrate 10 are fed between feed rollers 11, 12 and it will be seen that the cladding 9 is spaced or bent away from the substrate 10 to expose a gap for the focussed heating beam (either the electron beam of FIG. 1 or the laser beam of FIG. 2), the apex of the gap defining the interface 5. Following a full sweep of the power beam along the interface region 5 the feed rollers 11, 12 are rotated to progressively close the gap and move the base metal substrate 10 and cladding 9 in the direction 13. It is convenient to move the work away from the heating source so that the point of closure of the faying surfaces remains substantially consistent in distance from the focussing system. It is convenient to bend the thinner of the two components; thus in general, for cladding a relatively thick flat surface, the thinner cladding is bent through an arc and progressively rolled out across the flat suface as bonding proceeds. Alternatively or in addition the substrate can be urged by say an actuator towards the pressure rolls progressively.

Figure 3B:
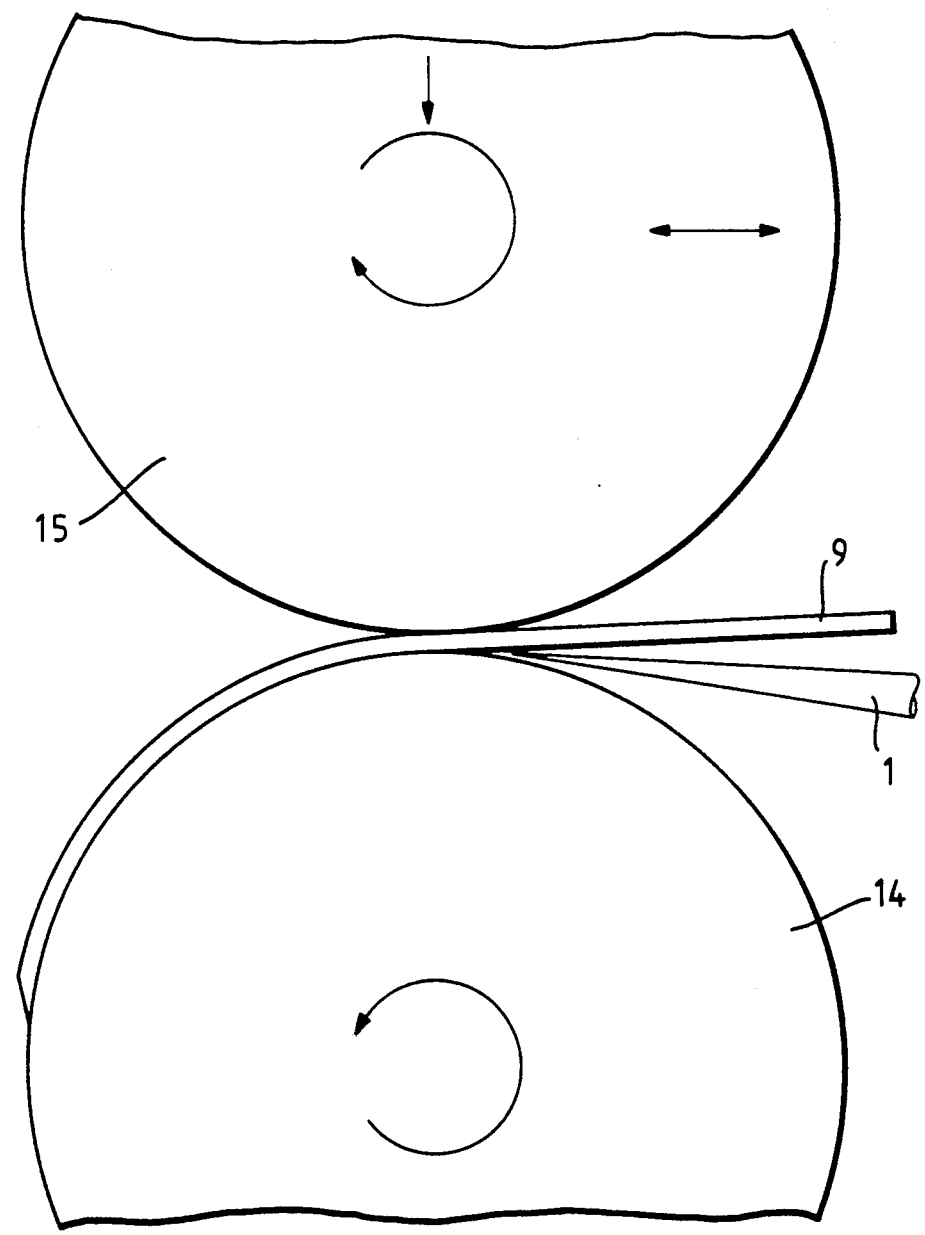
FIG. 3b illustrates the cladding of a cylinder.

FIG. 3b illustrates the cladding of a cylinder 14 which is positioned adjacent a feed roller 15 between which the cladding 9 is positioned In this case, as with the FIG. 3a case, the substrate is moved (linearly or by rotation, respectively) to maintain a consistent point of juxtaposition between the faying surfaces and the beam focussing system. As well as causing the two components to mate together, it is convenient to apply pressure at the point of contact to assist consolidation of the bond or weld zone. Preferably therefore the pressure roll 15 is adjustable with respect to the cylinder 14 to adjust both the applied load and the degree of bending of the cladding 9. In general the pressure roll is positioned towards the beam side of the weld zone to bend the cladding into contact with the substrate.

Figure 4A:
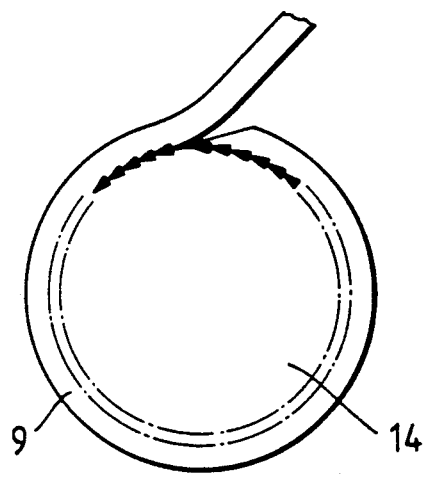
Figure 4B:
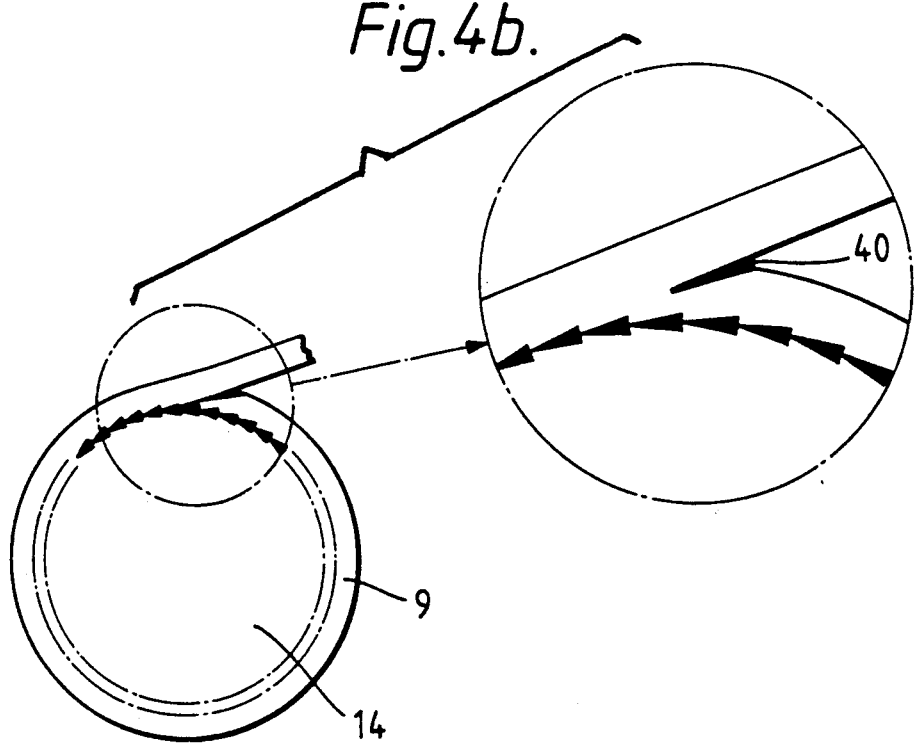

In the case of cladding a cylindrical object, it is convenient to chamfer the attached clad layer in the vicinity of the overlap to provide a scarf joint for the final closing of the clad surface, as shown in FIGS. 4a and 4b. In particular, if it is desirable to avoid any dilution or contamination of the cladding in the vicinity of the overlap, the latter may be joined or welded as for the remainder of the periphery, except that the bond zone or weld is terminated before the overlap is mechanically closed. Subsequently a heat run is applied to bond 40 the exposed extremity of the overlap cladding, utilising operating conditions which avoid excessive penetration so that only the clad material is bonded to itself (without pick-up from the prior weld zone which includes an admixture of the substrate).

Figure 4C:
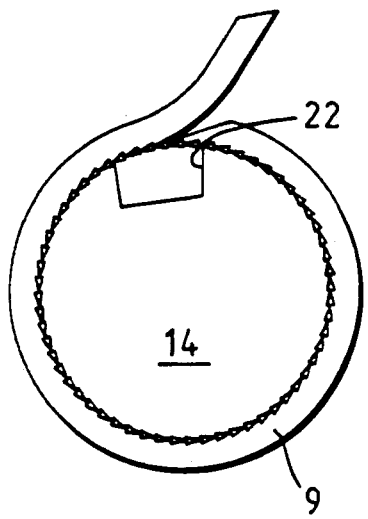
FIGS. 4c to 4e illustrate modified methods of cladding a cylinder.
Figure 4D:
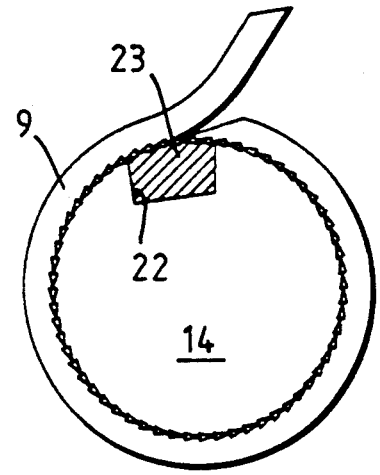
Figure 4E:
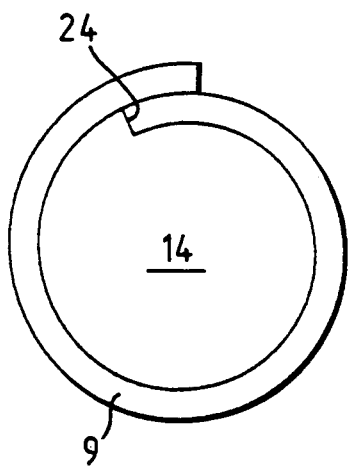

Alternatively, or in addition, the cylinder 14 can have a suitable groove 22 cut into it, so that in welding the final stage no material from the substrate is melted into the closing weld, FIG. 4c. Yet again, such a groove 22 may be filled with a strip 23 of the clad material, so again the final weld is not contaminated by the substrate material. The strip 23 may itself be attached to the sides of the groove 22 by electron beam or laser welding giving a weld zone of a high depth to width ratio thus limiting the extent of contamination of the strip by the substrate, FIG. 4d. As a further alternative, with a prepared chamfer 24 in the cylinder 14 the cladding may be first welded at the interface according to the invention and subsequently welded to itself at the final closing stage FIG. 4e.

These and other arrangements may be adopted according to the requirements of the final clad product and its geometry, while still maintaining an outer surface to the cladding which is free from contamination or admixture of the substrate.

As was mentioned in connection with FIGS. 1 and 2, the focussed beam may be oscillated about its axis, although this is not essential, through small distances for example for better control of the heat zone profile. Such oscillation will typically be of a small amplitude compared with the transverse sweeps along the interface region 5 and is typically less than 1 mm in extent at frequencies well in excess of 10 Hz, such as of the order of 50 Hz and for electron beams even upwards of 500 Hz.

One particular application is in the cladding of rolls used in the paper mill industry which rolls may be some 5-9 m in length and 1-1.5 m in diameter. Here a metal substrate can be clad with an appropriate metal layer which has suitable properties for removal of the wet paper without tearing or damaging the paper surface. Such a layer may be deposited in the manner described according to the invention, for example using laser heating, and terminated in a manner to avoid excess contamination from the substrate. The exposed clad surface is subsequently finish machined or ground and polished as desired.

Figure 5:
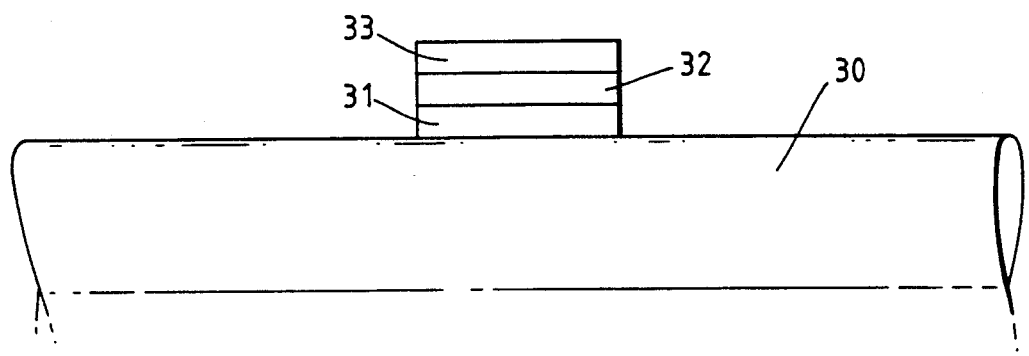
FIG. 5 illustrates a multi-layer cladding.

Although the invention is particularly advantageous for applying a single thin layer of cladding to a substrate, it can also be utilised in developing a thicker cladding by multi-layer methods. This approach is useful where a relatively thick cladding is desired on a cylinder, rod or tube, of relatively small radius of curvature where bending a thick cladding is inconvenient or difficult. For example, in building up worn parts of shafts 30, (FIG. 5) or making a bearing surface of particular properties on a limited zone of a shaft, it is preferable to apply a thin clad layer 31 in the manner described and continue the operation for more than one revolution of the substrate so laying down additional layers 32, 33. Thus, with a 1 mm thick Inconel cladding, a deposit of total thickness of 3 mm can be obtained from nominally three revolutions of the substrate without any contamination as previously described. Moreover, with multi-layer methods, the relatively tight limits on the weld width and high value of depth to width ratio can be relaxed. Thus a wider weld extending substantially to the full thickness of the cladding material will in a multi-layer arrangement lead to negligible contamination or dilution of the outermost layer. Furthermore the productivity is improved by having virtually continuous sweep of the beam (particularly for the smaller seam distances, and using an angularly deflected beam such as in FIG. 1). Under such conditions, using a rapidly repeated sweep of the beam (or even a virtually continuous sawtooth oscillation or raster at a sufficiently high frequency), the requirement for deep penetration is also relaxed and a penetration by the beam of only one or two millimeters can suffice. The continuous heating will lead to a conduction type weld pool of relatively low depth to width ratio, which is still acceptable so long as the weld width is not so great as to break through to the outer surface of the cladding.

More than one clad layer is also of an advantage where the cladding and the substrate are metallurgically incompatible or lead to brittle intermetallic alloys. Here one or more intermediate layers are deposited where each is compatible with the substrate or prior layer and with the final cladding or next layer. Again, the interface bonding or fusing using a focused beam avoids the problems of contamination or pick up of the substrate by the outer layer of cladding.

Figure 6:
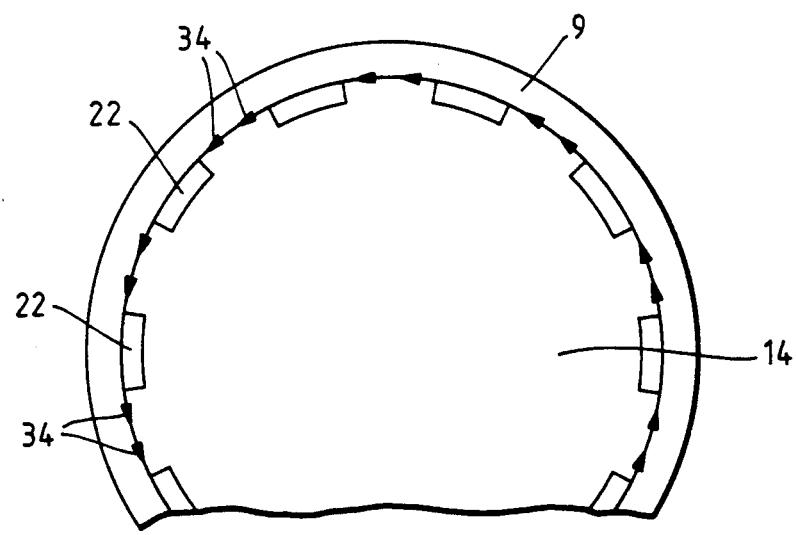
FIG. 6 illustrates a further example of cladding a cylinder.

It is not necessary for the cladding in some applications to be continuously bonded to the substrate, but adequate strength is obtained with stitch welding. This also leads to higher productivity. Thus when one weld of the contact zone between the cladding and the substrate is complete, the work can be advanced a finite amount such that the next weld is spaced from the first. Thus, unlike the illustration in FIG. 4, it is not necessary for each weld to be of such penetration and so positioned that it contacts the previous weld zone. An example is shown in FIG. 6 where exaggerated conditions have been used to show not only separation of the welds 34 one from another, but separation of the clad layer from the substrate in between the weld zones. This arrangement can be further developed to allow channels such as for fluid flow between the weld zones for example to aid cooling, or heating, of the clad layer in use.

With some materials, particularly ferritic alloys, the rapid cooling of such narrow welds of high depth to width ratio leads to excessive hardening (Transformation hardening). To reduce or alleviate this effect the work is preferably preheated to some 300° C. or greater during the welding operation. Alternatively, the work (cladding and substrate) is heat treated after welding to reduce the hardness, particularly in a transformation hardened clad layer.

These and other treatments are well known in the field of welding and metallurgy and can be applied as desired to obtain the preferred characteristics in the outer surface of the clad layer which according to the invention is essentially composed of the clad material alone without pick up from the substrate.

We claim:

1. A method of joining a covering layer to a substrate, the method comprising placing part of the covering layer on the substrate with the remaining part of the covering layer spaced from the substrate so as to expose a region of contact between the covering layer and substrate; causing a focussed power beam to impinge on the contact region so as to bond or fuse the substrate and covering layer together; and thereafter
   a) moving the spaced part of the covering layer towards the substrate so as to change the position of the contact region;

b) causing the focussed power beam to impinge on the new contact region so as to cause bonding or fusion; and, c) repeating steps a) and b) until the covering layer is bonded or fused to the substrate, characterised in that the beam is traversed along the contact region in step (b); and in that step (a) is carried out in a non-continuous stepwise manner.

2. A method according to claim 1, wherein the power beam comprises a laser beam or an electron beam.

3. A method according to claim 1, wherein the power beam produces a softened or melted zone which has a depth/width ratio in excess of 5:1 in the direction of the beam axis compared with normal to the substrate surface.

4. A method according to claim 1, wherein the power beam impinges on both the substrate and covering layer.

5. A method according to claim 1, wherein less than half the thickness of the covering layer is mixed or alloyed with the substrate.

6. A method according to claim 1, wherein the beam traverses the full width of the substrate being covered.

7. A method according to claim 6, wherein the beam is oscillated about its axis in addition to the traverse movement.

8. A method according to claim 7, wherein in the beam undergoes a sinusoidal or sawtooth oscillation.

9. A method according to claim 7, wherein the oscillation rate exceeds 10 Hz.

10. A method according to claim 1 for providing a covering layer on a cylindrical substrate in which the ends of the covering layer are caused to overlap, the underlying section of the covering layer being chamfered in the vicinity of the overlap.

11. A method according to claim 1 for covering a cylindrical substrate, wherein a groove is positioned adjacent the initial position of the covering process.

12. A method accoring to claim 11, wherein the groove is filled with a strip of the covering material.

13. A method according to claim 1, wherein the substrate and covering layer comprise metals or metal alloys.

* * * * *